United States Patent
McCrory et al.

(10) Patent No.: US 7,287,186 B2
(45) Date of Patent: Oct. 23, 2007

(54) SHARED NOTHING VIRTUAL CLUSTER

(75) Inventors: Dave D. McCrory, Austin, TX (US);
Robert A. Hirschfeld, Austin, TX (US)

(73) Assignee: Surgient Inc., Austin, TX (US)

( * ) Notice: Subject to any disclaimer, the term of this patent is extended or adjusted under 35 U.S.C. 154(b) by 497 days.

(21) Appl. No.: 10/858,295

(22) Filed: Jun. 1, 2004

(65) Prior Publication Data
US 2004/0243650 A1 Dec. 2, 2004

Related U.S. Application Data (60) Provisional application No. 60/474,992, filed on Jun. 2, 2003.

(51) Int. Cl.
*G06F 11/00* (2006.01)
(52) U.S. Cl. ............................................. 714/13; 714/6
(58) Field of Classification Search ...................... None
See application file for complete search history.

(56) References Cited

U.S. PATENT DOCUMENTS

| | | | |
|---|---|---|---|
| 4,912,628 A | 3/1990 | Briggs | |
| 5,062,037 A | 10/1991 | Shorter et al. | |
| 5,201,049 A | 4/1993 | Shorter | |
| 5,611,050 A | 3/1997 | Theimer et al. | |
| 5,802,290 A | 9/1998 | Casselman | |
| 5,917,997 A * | 6/1999 | Bell et al. ...................... | 714/4 |
| 5,996,026 A | 11/1999 | Onodera et al. | |
| 6,003,050 A | 12/1999 | Silver et al. | |
| 6,041,347 A | 3/2000 | Harsham et al. | |
| 6,075,938 A | 6/2000 | Bugnion et al. | |
| 6,104,699 A | 8/2000 | Holender et al. | |
| 6,247,057 B1 * | 6/2001 | Barrera, III ................. | 709/229 |
| 6,256,637 B1 | 7/2001 | Venkatesh et al. | |
| 6,272,523 B1 | 8/2001 | Factor | |
| 6,272,537 B1 | 8/2001 | Kekic et al. | |
| 6,496,847 B1 | 12/2002 | Bugnion et al. | |
| 6,553,401 B1 * | 4/2003 | Carter et al. ................. | 709/200 |
| 6,625,705 B2 * | 9/2003 | Yanai et al. ................. | 711/162 |
| 6,745,303 B2 * | 6/2004 | Watanabe ................... | 711/161 |

(Continued)

OTHER PUBLICATIONS

Stonebraker et al., "Distributed RAID—A New Multiple Copy Algorithm", 1990, IEEE.*

(Continued)

*Primary Examiner*—Gabriel Chu
(74) *Attorney, Agent, or Firm*—Gary R. Stanford (57) ABSTRACT

A shared-nothing virtual cluster including multiple virtual servers located on a corresponding number of physical servers linked together via a network. The virtual servers collectively form an active/passive (A/P) cluster including an active virtual server and at least one passive server. The shared-nothing virtual cluster further includes an interlink and multiple virtual drives located on the physical servers. The active virtual server handles a cluster load and executes a first operating system that operates the virtual drives in a data redundant configuration that collectively stores a data set for the cluster. Each passive virtual server, when activated, is coupled to a sufficient number of the virtual drives with redundant information to recover the data set for the cluster. The interlink is operatively configured to detect failure of the active server and to initiate promotion of a virtual server to active status to resume handling the cluster load after failover.

39 Claims, 4 Drawing Sheets

U.S. PATENT DOCUMENTS

| | | | |
|---|---|---|---|
| 7,043,665 B2 * | 5/2006 | Kern et al. | 714/5 |
| 7,065,589 B2 * | 6/2006 | Yamagami | 709/246 |
| 7,200,622 B2 * | 4/2007 | Nakatani et al. | 707/202 |
| 7,222,172 B2 * | 5/2007 | Arakawa et al. | 709/224 |
| 7,234,075 B2 * | 6/2007 | Sankaran et al. | 714/13 |
| 2003/0018927 A1 * | 1/2003 | Gadir et al. | 714/4 |
| 2003/0105829 A1 * | 6/2003 | Hayward | 709/214 |
| 2003/0188233 A1 * | 10/2003 | Lubbers et al. | 714/100 |
| 2004/0078467 A1 * | 4/2004 | Grosner et al. | 709/226 |

OTHER PUBLICATIONS

Long et al., "Swift/RAID: A Distributed RAID System", Summer 1994, Computing Systems, vol. 7, Iss. 3, pp. 333-359.*

Henry Baltazar, Virtual Storage Age, eWEEK, pp. 45 and 48, Aug. 27, 2001, Ziff David Media Inc., New York, New York.

Michael Vizard, Automated help is on the horizon, InfoWorld, Mar. 1, 2002, InfoWorld Media Group, San Francisco, CA.

* cited by examiner

SHARED NOTHING VIRTUAL CLUSTER

CROSS-REFERENCE TO RELATED APPLICATIONS

This application claims the benefit of U.S. Provisional Application No. 60/474,992 filed on Jun. 2, 2003, which is incorporated by reference herein for all intents and purposes.

BACKGROUND OF THE INVENTION

1. Field of the Invention

The present invention relates to clustering and virtualization technology, and more particularly to a shared-nothing virtual cluster formation that eliminates shared hardware.

2. Description of the Related Art

The following definitions are provided for this disclosure with the intent of providing a common lexicon. A "physical" device is a material resource, such as, for example, a server, a network switch, memory devices, a disk drive, etc. Even though physical devices are discrete resources, they are not inherently unique. For example, random access memory (RAM) devices and a central processing unit (CPU) in a physical server may be interchangeable between like physical devices. Also, network switches may be easily exchanged with minimal impact. A "logical" device is a representation of a physical device to make it unique and distinct from other physical devices. For example, every network interface has a unique media access control (MAC) address. A MAC address is the logical unique identifier of a physical network interface card (NIC). A "traditional" device is a combined logical and physical device in which the logical device provides the entire identity of a physical device. For example, a physical NIC has its MAC address permanently affixed so the physical device is inextricably tied to the logical device.

A "virtualized" device breaks the traditional interdependence between physical and logical devices. Virtualization allows logical devices to exist as an abstraction without being directly tied to a specific physical device. Simple virtualization can be achieved using logical names instead of physical identifiers. For example, using an Internet Uniform Resource Locator (URL) instead of a server's MAC address for network identification effectively virtualizes the target server. Complex virtualization separates physical device dependencies from the logical device. For example, a virtualized NIC could have an assigned MAC address that exists independently of the physical resources managing the NIC network traffic.

A cluster includes at least two computers or servers communicatively coupled together and to a shared hardware disk drive that stores shared data. Clustering may be implemented as Active/Active (A/A) or Active/Passive (A/P). For the A/A configuration, the servers are active and operating to handle respective loads. The shared data (called a "quorum") stored on the shared drive is constantly shared between the two servers. In the event of failure of either server in a two-server cluster for the A/A configuration, the other server automatically resumes responsibility for the entire load previously shared by both. For the A/P configuration, one of the servers is the "active" node whereas the other server is the "passive" node. The active node handles the entire cluster load while the passive node remains in a standby state or the like. In the event of failure of the active server in the A/P configuration, a "failover" occurs in which the passive server is switched or otherwise "promoted" to active mode to resume handling the cluster load. In this manner, the passive server operates as a fail-safe mechanism for the active server.

A link is provided between the clustered servers to detect failure and to facilitate a failover event. The link may perform several functions, such as monitoring the status of the active server, detecting failure of the active server and providing failure notification. The link may further operate to coordinate failover, if necessary. In the event of failure, the active server is "demoted" to passive status and the passive server is promoted to active status to effectuate the failover.

A traditional virtual cluster employs a virtualization layer on top of physical devices. The virtual cluster is similar to the physical cluster in that it includes two computers or servers communicatively coupled together and a link that detects a failover condition. In the virtual case, however, a first virtual server is implemented on a first underlying physical server and a second virtual server is implemented on a second physical server. A communication link is provided between the virtual servers and with a shared virtual drive implemented on a third physical device. The shared virtual drive stores shared data for the virtual servers of the virtual cluster.

Operation of the virtual cluster is similar to its physical counterpart. For the A/P configuration in which the first virtual server is the active node, in the event of failure of the first physical server, the passive virtual server is promoted to active mode to resume handling of the cluster load. In this case, a drive image or the like describing or otherwise defining characteristics of the virtual server is stored on the virtual drive, and is employed to create or otherwise power up the virtual server during the failover event.

The traditional cluster configurations have several disadvantages. Both servers require access to the shared drive, which results in an expensive and complicated structure. The traditional clusters have physical limitations in that the physical separation between the physical servers and physical devices storing the shared data is a limiting factor. Also, the additional shared hardware for the shared drive results in an additional point of failure. The shared data configuration is expensive and requires special software and configuration. The operating system (OS) of both servers must support clustering. Application software may need to support clustering. For the virtual configuration, the virtualization software must support clustering or otherwise be configured to handle the clustered structure. The shared drive (physical or virtual) must be pre-configured to support clustering. The clustering portions, including the servers and drives, are not easily replaced or substituted.

There is a need in the industry for a more flexible and less complicated cluster configuration.

SUMMARY OF THE INVENTION

A shared-nothing virtual cluster according to an embodiment of the present invention includes a plurality of virtual servers located on a corresponding plurality of physical servers linked together via a network, where the virtual servers collectively form an active/passive (A/P) cluster including an active virtual server and at least one passive server. The shared-nothing virtual cluster further includes an interlink and a plurality of virtual drives located on the physical servers. The active virtual server handles a cluster load and executes a first operating system (OS) that operates the virtual drives in a data redundant configuration that collectively stores a data set for the cluster. Each passive virtual server is coupled to a sufficient number of the virtual drives with redundant information to recover the data set for the cluster. The interlink is operatively configured to detect failure of the active virtual server and to initiate promotion of a passive virtual server to active status to resume handling the cluster load after failover.

In one embodiment, the first OS maintains first and second virtual drives in a mirrored configuration. Alternatively, the virtual drives may include at least three drives in the data redundant configuration, such as, for example, a RAID level 5 configuration. The passive virtual server may be an inactive instance of the active virtual server and include a second OS that is configured, when the passive virtual server is activated, to operate the second virtual drive as its primary drive storing the data set. The inactive instance may further be configured to use a replacement drive to complete the data redundant configuration, such as to replace a virtual drive located on a failed physical server.

In other alternative embodiments, each virtual drive may include a virtual static drive and one or more virtual differential drives. The network may be an inter-network so that the physical servers may be physically located at geographically remote locations. In one embodiment, the interlink includes a status monitor, a load monitor and a cluster manager. The status monitor detects failure of the active virtual server. The load monitor monitors relative load level of each of the physical servers. The cluster manager configures and maintains the cluster, manages failover, and selects a passive server for promotion during failover. The cluster manager may further be configured to monitor load information from the load manager to ensure adequate resources before and after the failover.

A virtual cluster according to an embodiment of the present invention includes a first virtual server located on a first of a plurality of physical servers, where the first virtual server is initially active and handling a cluster load. Cluster data is stored in a plurality of virtual drives organized in a data redundant configuration. The virtual cluster includes a disk image stored on the virtual drives and an interlink. The disk image incorporates attributes of the first virtual server. The interlink is operative to monitor the first virtual server and to initiate promotion of a second virtual server on a second physical server to active status using the disk image in the event of failure of the first virtual server to effectuate failover. The second virtual server, when activated, resumes handling of the cluster load and accesses the cluster data. The virtual drives may be configured in any suitable data redundant configuration, such as a mirrored configuration or a configuration including three or more drives. Other alternative embodiments are contemplated, such as similar to those previously described.

A method of configuring and operating a shared-nothing virtual cluster according to an embodiment of the present invention includes operating an active virtual server on a first one of a plurality of physical servers coupled together via a network to handle a cluster load, storing, by the active virtual server, cluster data onto a plurality of virtual drives located on the physical drives and organized in a data redundant configuration, detecting failure of the first physical server, and in the event of failure of the first physical server, activating a second virtual server on a second physical server to resume handling of the cluster load, and providing access by the activated second virtual server to a sufficient number of the virtual drives collectively storing the cluster data.

The activating of a second virtual server may include activating an inactive instance of the active virtual server.

The method may include storing a disk image including attributes of the active virtual server, and retrieving and using the disk image to activate the second virtual server. The method may include monitoring relative load of each of the physical servers and providing load information. The method may include selecting the first physical server to initially handle the cluster load based on the load information, and selecting the second physical server to resume handling of the cluster load based on the load information in the event of failure of the first physical server. Other alternative embodiments are contemplated, such as similar to those previously described.

BRIEF DESCRIPTION OF THE DRAWING(S)

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
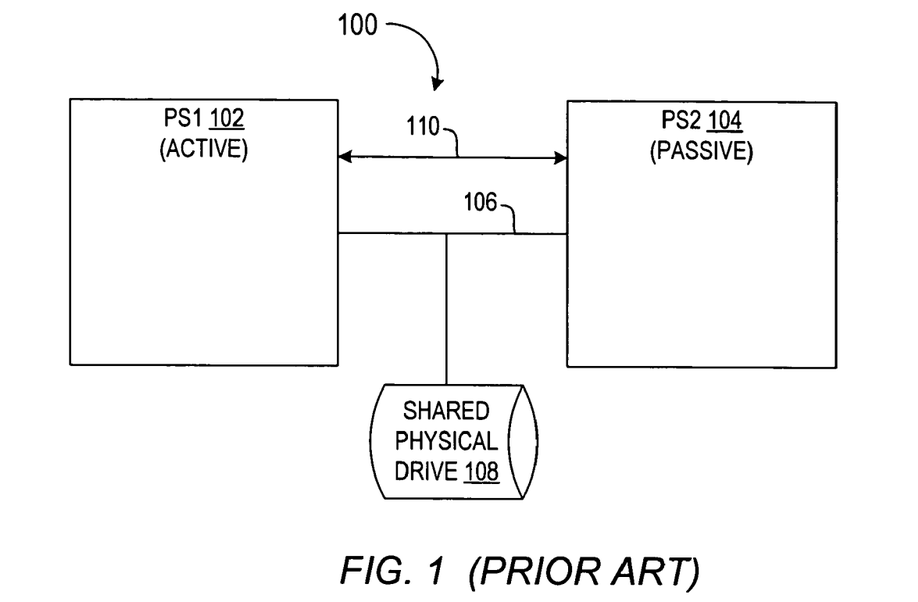
FIG. 1 is a simplified block diagram of a traditional cluster employing physical devices.

FIG. 1 is a simplified block diagram of a traditional cluster 100 employing physical devices. The cluster 100 includes two computers or servers 102 and 104 coupled together via a network 106, which is further coupled to a shared hardware disk drive 108 that stores shared data. The shared data stored on the shared drive 108 is constantly shared between the two servers. The shared physical drive 108 may be implemented as a System Area Network (SAN) or the like. Although clustering may be implemented as Active/Active (A/A) or Active/Passive (A/P), the present invention primarily concerns the A/P configuration. For the A/P configuration, one of the servers, such as the server 102, is the active node whereas the other server 104 is the passive node. The active node handles the entire cluster load while the passive node remains in a standby state or the like. In the event of failure of the active server 102 in the A/P configuration, a "failover" occurs in which the passive server 104 is switched or otherwise "promoted" to active mode to resume handling the cluster load. In this manner, the server 104 operates as a fail-safe mechanism for the server 102.

An interlink 110 is provided between the servers 102, 104 to detect failure and to facilitate a failover event. The interlink 110 monitors the status of the active server 102, detects failure of the active server 102 and provides failure notification. The interlink 110 may further operate to coordinate failover, if necessary. In the event of failure, the active server 102 is "demoted" to passive status and the passive server 104 is promoted to active status to effectuate the failover.

Figure 2:
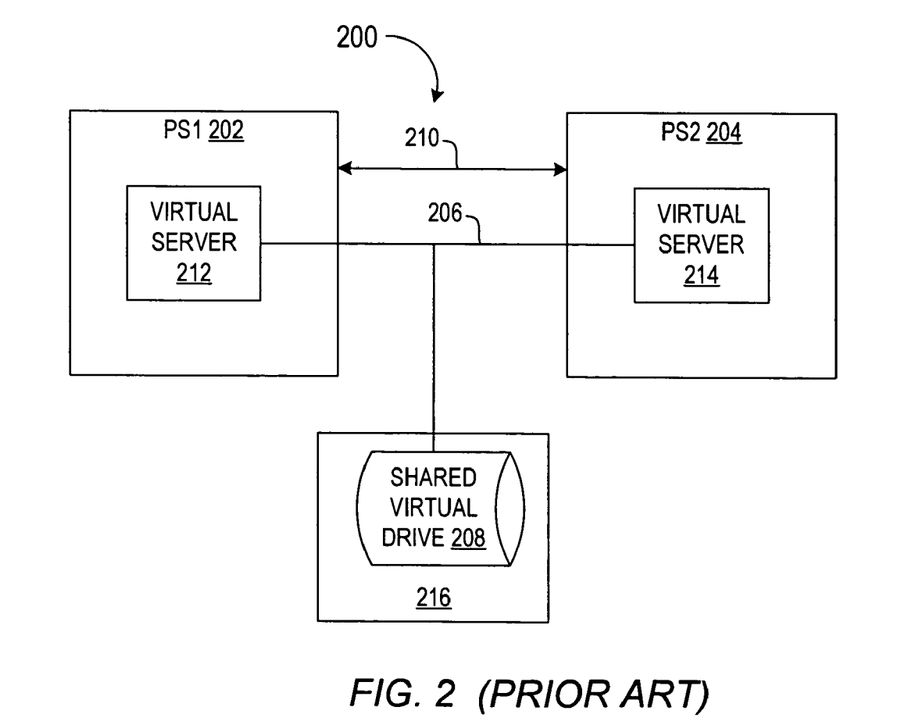
FIG. 2 is a simplified block diagram of a traditional virtual cluster that employs a virtualization layer on top of physical devices.

FIG. 2 is a simplified block diagram of a traditional virtual cluster 200, that employs a virtualization layer on top of physical devices. The virtual cluster 200 is similar to the physical cluster 100 in that it includes two computers or servers 202 and 204 coupled via a network 206 and an interlink 210 that detects a failover condition for the servers 202 and 204. In this case, however, a virtual server 212 is implemented on the underlying physical server 202 and a virtual server 214 is implemented on the physical server 204. Virtual extensions of the network 206 establish a communication link between the virtual servers 212 and 214 and with a shared virtual drive 208 implemented on another physical device 216. The shared virtual drive 208 stores shared data for the virtual servers 212 and 214.

Operation of the cluster 200 is similar to the cluster 100. For the A/P configuration in which the virtual server 212 is the active node, in the event of failure of the physical server 202 as detected by the interlink 210, the passive virtual server 214 is promoted to active mode to resume handling of the cluster load. In this case, a drive image or the like describing or otherwise defining characteristics of the virtual server 212 is stored on the virtual drive 208, and is employed to create or otherwise power up the virtual server 214 during the failover event.

The traditional cluster configurations as exemplified by the clusters 100 and 200 have several disadvantages. Both of the servers (102, 104 or 212, 214) require access to the shared drive (108 or 208), which results in an expensive and complicated structure. The traditional clusters 100 and 200 have physical limitations in that the physical separation between the physical servers and physical devices storing the shared data is a limiting factor. Also, the additional shared hardware, such as the shared physical drive 108 or the physical device 216, results in an additional point of failure. The shared data configuration is expensive and requires special software and configuration. The operating system (OS) of both servers must support clustering. Application software may need to support clustering. For the virtual configuration, the virtualization software must support clustering or otherwise be configured to handle the clustered structure. The shared drive (physical 108 and virtual 208) must be pre-configured to support clustering. The clustering portions, including the servers and drives, are not easily replaced or substituted.

Figure 3:
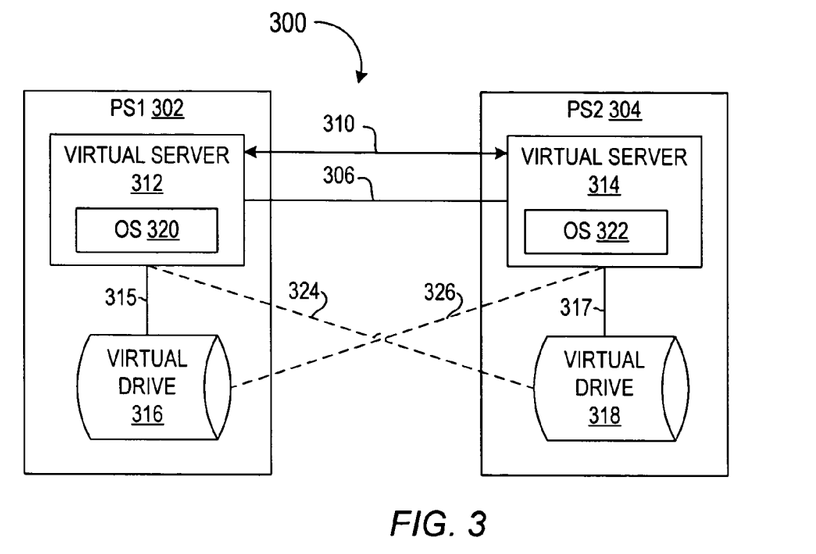
FIG. 3 is a block diagram of a shared-nothing A/P cluster implemented according to an exemplary embodiment of the present invention.

FIG. 3 is a block diagram of a shared-nothing A/P cluster 300 implemented according to an embodiment of the present invention. A virtual server 312 is located on a first physical server 302 and serves as the primary or active server in the A/P cluster configuration for handling the entire cluster load. Another virtual server 314 is located on a second physical server 304 and serves as the secondary or passive server in the A/P cluster configuration. The virtual servers 312 and 314 are communicatively coupled or linked together via a network 306. The virtual server 314 is passive and initially in a standby or powered-down mode. In one embodiment, the virtual server 314 is an inactive instance of the virtual server 312, as further described below. An interlinik 310 is provided between the physical servers 302 and 304 or otherwise between the virtual servers 312 and 314. The interlink 310 at least operates to detect and provide notice of failure of the virtual server 312 and/or the physical server 302. A virtual drive 316 is implemented on the physical server 302 and coupled to the active virtual server 312 during normal operation via a local link 315. A network link 324 is provided between the virtual server 312 and another virtual drive 318 implemented on the physical server 304. The network links to the virtual drives described herein, including the network link 324, are shown with dashed lines and are implemented across corresponding networks, such as the network 306.

The virtual server 312 executes an operating system (OS) 320 that is configured to use the virtual drive 316 as its primary drive and to operate the virtual drive 318 via the link 324 as a mirrored drive in a mirrored data redundant configuration, such as according to RAID level 0. The OS 320 maintains a copy of data on both of the virtual drives 316 and 318. The virtual server 314 includes an OS 322, which is a substantially identical copy of the OS 320 while the virtual server 312 is active. The persistent attributes of the two virtual servers 312, 314 are the same so that they effectively have the same identity. Examples of persistent attributes include a media access control (MAC) address, a boot disk image, a system identifier, a processor type and access credentials. The persistent attributes may further include semi-persistent attributes including an internet protocol (IP) address, a logical name, a server cloud manager identifier, user account information, a non-boot disk image and network connections. Examples of non-persistent attributes include processor resource information, memory resource information, keyboard/video/mouse (KVM) resources and disk redundancy level. There is no conflict between the virtual servers 312 and 314 since only one is active at any given time.

In the event of a failure of the virtual server 312 or the physical server 302 as detected by the interlink 310, the passive virtual server 314 is activated on physical server 304 to resume handling of the cluster load. Since the persistent attributes of the virtual server 314 are the same as the virtual server 312, it is effectively identified as the same server which resumes in place of the failed virtual server 312. The OS 322, when activated, sees and uses the virtual drive 318 as its primary drive via local link 317 rather than the virtual drive 316. The virtual server 314 may be powered up using a drive image stored on the virtual drives 316 and 318. Since the virtual drive 318 contains a duplicate copy of the data set on the virtual drive 316 in accordance with mirrored drive configuration, no cluster data is lost during the failover event. Furthermore, in one embodiment, the OS 322 operates the virtual drives 318 and 316 in a mirrored configuration, similar to that of the OS 320, except that the virtual drive 318 is its primary drive whereas the virtual drive 316 is the mirrored drive coupled via another network link 326. Thus, the OS 322 of the newly started virtual server 314 operates the virtual drives 318 and 316 in a similar yet reversed mirrored configuration. The links 324 and 326 form a cross-linked connection between the virtual servers 312, 314 and the virtual drives 316, 318.

In one exemplary embodiment, the configuration change regarding the reversed use of the virtual drives 316 and 318 is made at the virtual software level prior to failover and transparent to the operating systems 320 and 322. Both of the operating systems 320 and 322 are configured to use the same redundant drive set (e.g., same RAID set) in which "drive 1" is the local drive and "drive 2" is the remote drive. The OS 320, when active, sees the virtual drives 316 and 318 as redundant drive set in which drive 1 is the virtual drive 316 and drive 2 is the virtual drive 318. When the OS 322 is activated upon failover, the identity and operation of the OS 322 is substantially the same as the OS 320 in which it sees the same redundant drive set including the virtual drives 316 and 318, except that, since the OS 322 is activated on a different physical server, it sees drive 1 as the virtual drive 318 and drive 2 as the virtual drive 316. In this manner, when a passive server is activated, it does not see a serious drive failure situation since its primary drive is operable. This is true even if the mirrored drive 316 is temporarily unavailable. This configuration change improves the recovery process since the activated passive server can automatically resume operations as though a failure had not occurred.

It is noted that the links 324 and 326 may be effectively broken upon start up of the virtual server 314, such as in the event that the physical server 302 was the cause of the failure where the virtual drive 316 is no longer available. Nonetheless, no data is lost and the virtual server 314 may operate uninterrupted while the virtual drive 316 is unavailable or otherwise while the link 326 is broken. When the physical server 302 is restarted and the virtual drive 316 is again available, the OS 322 of the virtual server 314 automatically re-synchronizes the data on the mirrored virtual drive 316 with the data on the virtual drive 318. Operation may proceed in this reversed manner in which the virtual server 314 continues as the active server while the virtual server 312 remains as the passive server in standby and/or powered down mode. Alternatively, the active/passive status of the virtual servers 312, 314 may be swapped again to return to the original configuration if desired.

In an alternative embodiment, the OS 322 does not support any RAID level or mirroring and the link 326 is removed or otherwise not provided. In this case, in the event of failover, the virtual server 314 is activated and configured to operate using its local virtual drive 318 as its primary drive without loss of cluster data. When the physical server 302 is available again, the virtual server 314 is suspended or otherwise shut down, and the virtual drive 316 is synchronized with the virtual drive 318. Then, the virtual server 312 is restarted using the virtual drive 316 as its primary and the virtual drive 318 as its secondary, mirrored drive.

It is appreciated that a shared drive is not required for the shared-nothing cluster 300. Instead, the data redundant capabilities of the OS 320 (e.g., RAID or the like) are utilized to synchronize the same cluster data or data set at two different locations on two different physical computers. The synchronization of the virtual drives 316 and 318 is transparent and ongoing and fully enables successful failover without loss of data. The original configuration (or otherwise, the equivalent reversed configuration) is quickly re-established in a seamless manner since the data redundant disk operation capabilities automatically synchronize and reconstruct one drive to match another. A significant advantage is that the virtualization software, the operating systems 320 and 322, and the application software provided on both of the virtual servers 312, 314, are not required to support clustering or even be aware that a clustered configuration exists. The virtual drives 316 and 318 do not have to be configured to support clustering or to share data between two servers. Generic application, OS and virtualization software may be employed as long as the OS supports some form of data redundant configuration, such as, for example, RAID level 0 or any other suitable RAID level. Embodiments of the present invention are illustrated using RAID level 0 and 5 configurations, although it is understood that other RAID levels or other data redundant methods now known or newly developed may be used without departing from the spirit and scope of the present invention. The data is automatically maintained by the data redundancy operations, such as the standard RAID disk operation capabilities. Data redundancy across multiple drives ensures the integrity of the data even while a drive is missing or unavailable (e.g., data maintained on one drive while mirrored drive is missing).

The cluster 300 may be optimized by optimizing the network 306 to limit traffic with a special network link or the like between the physical servers 302, 304. In one embodiment, the network 306 is configured as a dedicated network. Alternatively, the network 306 is implemented as a physical crossover. The mirror network link 326 is optional and not required since the virtual server 314 may resume operation after failover using the virtual drive 318 without the virtual drive 316. Alternatively, the link 326 may be established at a later time or even by a different physical server (not shown). Also, the original physical server 302, after failover, is not required to rebuild the cluster 300. For example, the OS 322 synchronizes the data between the virtual drive 318 and another similar virtual drive on another physical server. Alternatively, the virtual server 314 is suspended and the OS associated with another virtual server on another physical server synchronizes the data between a different virtual drive and the virtual drive 318. In this latter case, the other virtual server continues operating as the active node whereas the virtual server 314 once again becomes the passive node.

The interlink 310 may be implemented in many different ways varying from simple to complex. The interlink 310 does not need to be implemented with network communication and may be implemented solely on the backup or passive node and provide relatively simple notifications. For example, the interlink 310 may comprise a simple monitor function on the physical server 304 for monitoring the mirrored virtual drive 318 (e.g., file lock) to make the failover decision. The interlink 310 may be more complex and be designed to monitor one or more heartbeat signals from either or both of the physical server 302 and/or the virtual server 312. In another embodiment, the interlink 310 is a service function that detects failure of the active node and coordinates the failover process by promoting the passive node to active and maintain seamless handling of the load.

In a more complex embodiment, the interlink 310 incorporates management functions that provide load monitoring, load balancing and cluster operation and configuration. In one embodiment, the interlink 310 incorporates management functionality to setup, monitor and maintain one or more clusters. The interlink 310 may be designed with any level of intelligence to properly build a cluster configuration and to optimize cluster load and operation over time in response to available resources and dynamic loads levels and re-building in response to node failure and during and after restoration. For example, in a more sophisticated embodiment, the interlink 310 performs vital pre-failure roles, such as helping to build the initial cluster configuration correctly and to periodically or continuously monitor loads on passive systems to ensure adequate resources in the event of failure of an active system. The interlink 310 is capable of redistributing cluster elements in a seamless manner to optimize load handling during normal operation (e.g., prior to a failover event) and during and after any failover event(s). The interlink 310 also manages restoration of operation to the original or main system when the failed main node is back online. The interlink 310 ensures appropriate cluster operation, such as by enforcing that only one node (and corresponding virtual server) is active at a time in the A/P cluster configuration. The interlink 310 demotes the failed node in response to a failover event and selects a passive node for promotion to active based on any combination of static considerations (e.g., predetermined passive activation order) and dynamic considerations, such as existing or anticipated loads.

The use of virtual servers for implementing the active and passive servers of the cluster nodes enables a significant advantage in that each passive server can be implemented as a substantial duplicate of the active server. This is achieved by storing attributes (e.g., persistent attributes) of the active virtual server in a file image that is stored on the virtual drives. The stored drive image is used to create or otherwise power up a passive virtual server to continue handling the cluster load previously being handled by the failed active node. Non-persistent attributes are provided and the local drive is configured to be the primary drive for the activated virtual server. The drive image can be stored on another storage or memory and can be used to create and activate the passive virtual server on the same or even a different physical server.

Figure 4:
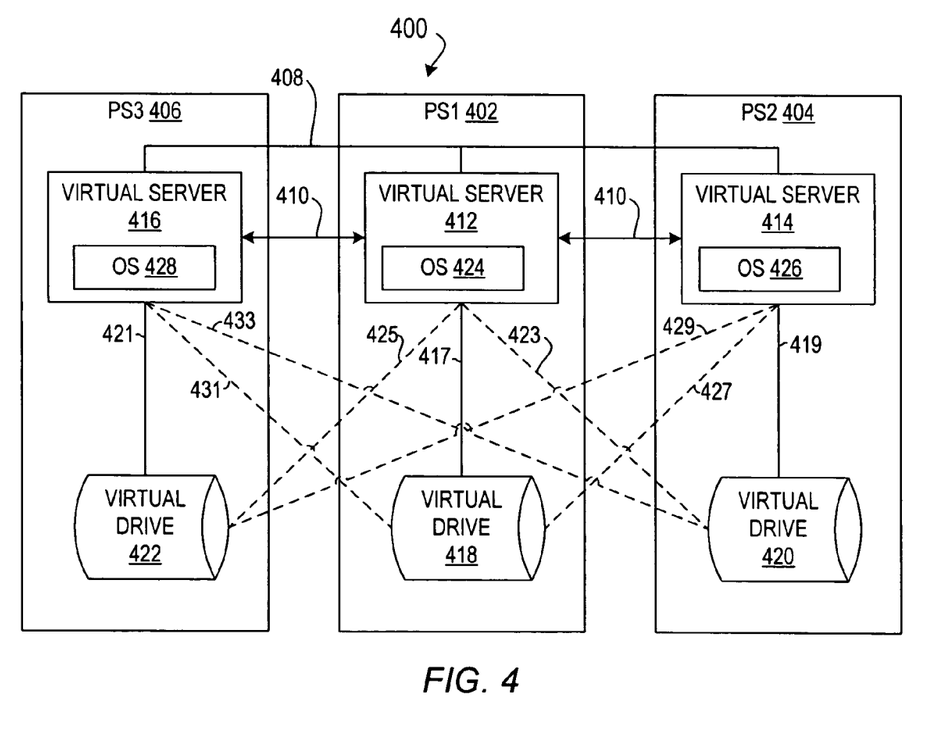
FIG. 4 is a block diagram of a shared-nothing cluster implemented according to another exemplary embodiment of the present invention employing a RAID level 5 configuration.

FIG. 4 is a block diagram of a shared-nothing cluster 400 implemented according to another exemplary embodiment of the present invention employing a RAID level 5 configuration. Three physical servers 402, 404 and 406 are communicatively coupled together via a network 408. Virtual servers 412, 414 and 416 are operated on the physical servers 402, 404 and 406, respectively. The virtual server 412 is initially the active server handling the entire cluster load whereas the virtual servers 414 and 416 are the passive servers in standby mode or otherwise powered down. In one embodiment, both of the virtual servers 414 and 416 are inactive instances of the virtual server 412. An interlink 410 is provided between the virtual server 412 and the virtual servers 414, 416 to detect failure of the active virtual server 412 and to active one of the passive virtual servers 414 or 416. The cluster 400 includes virtual drives 418, 420 and 422 located on physical servers 402, 404 and 406, respectively, and configured to be operated according to a data redundant configuration including three or more drives. An exemplary data redundant configuration is the RAID level 5 configuration. Thus, the virtual drives 418-422 collectively store the entire cluster data or data set. The active virtual server 412 executes an OS 424 that communicates with the virtual drives 418, 420 and 422 via links 417, 423 and 425, respectively, wherein link 417 is a local link and links 423 and 425 are network links. The virtual servers 414 and 416 include respective OSs 426 and 428, which are substantially identical to the OS 424. In the selected data redundant configuration (e.g., RAID level 5), redundancy of data is employed so that any one of the virtual drives 418-422 may be removed without loss of data. The information on the missing drive is reconstructed using the combined information of the remaining drives as known to persons having ordinary skill in the art. In this manner, less than all of the virtual drives are necessary to reconstruct the cluster data. Some RAID configurations with N disk drives enable complete data reconstruction with N-1 drives while others may enable complete reconstruction with the loss of 2 or more drives.

In the event of failure of the active virtual server 412, the interlink 410 selects and activates one of the virtual servers 414 or 416. Assuming the virtual server 414 is selected, the interlink 410 promotes the virtual server 414 to active, and its OS 426 is configured to use the virtual drive 420 as its primary drive via a local link 419. The OS 426 accesses the virtual drives 418 and 422 via first and second network links 427 and 429, respectively. If the link 427 is broken or otherwise while the virtual drive 418 is missing or unavailable, such as if the physical server 402 has failed, the virtual server 414 continues without interruption during the failover event since it has sufficient information to reconstruct all of the cluster data via the virtual drives 420 and 422 in accordance with the data redundancy configuration operation. The data redundancy operation continues even while a virtual drive is missing or unavailable as long as the remaining drives store sufficient redundant information to recover the data set for the cluster 400. When the physical server 402 is back online, the OS 426 automatically re-synchronizes the data on the virtual drive 418 with the virtual drives 420 and 422 in accordance with data redundancy operation. The virtual server 414 may continue as the active node, or the virtual server 412 may be promoted (while the virtual server 414 is suspended and demoted) to return to the original configuration. In a similar manner, the virtual server 416 includes the OS 428, a local link 421 to the virtual drive 422 and network links 431 and 433 to access the virtual drives 418 and 420, respectively. In this manner, the virtual server 416 may also be selected by the interlink 410 to be promoted to active to replace the failed previously-active node.

In a similar manner as previously described, in one embodiment, a configuration change is made regarding use of the virtual drives 418-422 at the virtual software level prior to failover and transparent to the operating systems 424-426. Each of the operating systems 424-426 is configured to use the same redundant drive set (e.g., same RAID level 5 drive set) in which "drive 1" is the local drive and the remaining drives are configured as remote drives. The OS 424, when active, sees the virtual drives 418-422 as a redundant drive set in which drive 1 is the virtual drive 418. When the OS 426 is activated upon failover, its identity and operation is substantially the same as the OS 424 in which it sees the same redundant drive set including the virtual drives 424-426, except that, since the OS 426 is activated on a different physical server, it sees drive 1 as the virtual drive 420. If the OS 428 is selected to be activated on failover, its sees the same data redundant drive set in which drive 1 is the virtual drive 422. The remaining drives in either case are ordered in a compatible manner to maintain integrity of the drive set. In this manner, when a passive virtual server is activated, its OS does not see a serious drive failure situation since its primary drive is operable. This is true even if the data redundant or mirrored drive of the failed server is temporarily unavailable. This configuration change improves the recovery process since the activated passive server can automatically resume operations as though a failure had not occurred.

It is appreciated that any one of the virtual drives 418-422 may be temporarily taken offline without losing data. Further, a different virtual drive may be brought online to take the place of the removed drive, and the operative OS of the active node automatically synchronizes the data on the new drive. The new virtual drive may be located on the same or even a different physical server as the removed virtual drive as long as the appropriate network links are provided. It is further appreciated that the passive virtual servers 414 and 416 in the cluster 400 may be temporarily removed and/or replaced with similar servers on the same or different physical servers. For example, a new physical server (not shown) may be provided to replace the physical server 404, where the virtual server 414 and/or virtual drive 420 may be moved to the new physical server or otherwise replaced as well. A separate management function or service (not shown) may be provided and operated on any of the physical servers 402-406 and/or virtual servers 412-416 or on different physical or virtual servers.

Also, the number of physical servers, virtual servers and virtual drives do not have to be equal. An active and passive pair of virtual servers may be supported with three or more virtual drives, such as in a RAID level 5 configuration. In general, any number of virtual servers and any number of virtual drives is contemplated as long as redundant data is appropriately maintained in the drive set to ensure against loss of data, such as provided in many RAID configurations. Although multiple virtual servers and/or virtual drives may be located on any single physical server, it may be desired to distribute the virtual servers and drives among as many physical servers as are available to ensure against loss of data in the event of failure of any one physical server. In one embodiment, the collective set of virtual drives for the cluster may store one or more disk images used to generate one or more of the passive virtual servers. The disk image(s) incorporate(s) attributes of the active virtual server.

In one embodiment, the interlink 410 incorporates management functionality to setup, monitor and maintain one or more clusters in a similar manner as previously described with respect to the interlink 310. The interlink 410 may be designed, for example, with any level of intelligence to properly build a cluster configuration and to optimize cluster load and operation over time in response to available resources and dynamic loads levels and re-building in response to node failure and during and after restoration. The interlink 410 selects from among multiple passive node for promotion to active in response to a failover event based on any combination of static considerations (e.g., predetermined passive activation order) and dynamic considerations, such as existing or anticipated loads. For example, if the physical server 404 is more heavily loaded as compared to the physical server 406 during a failover event in which the active physical server 402 fails, the interlink 410 selects to promote the virtual server 416 instead of the virtual server 414. Alternatively, even if the physical servers 404 and 406 are relatively evenly loaded during the failure, if the interlink 410 has information that the physical server 404 is about to incur a greater load, the interlink 410 selects the virtual server 416 on physical server 406.

Figure 5:
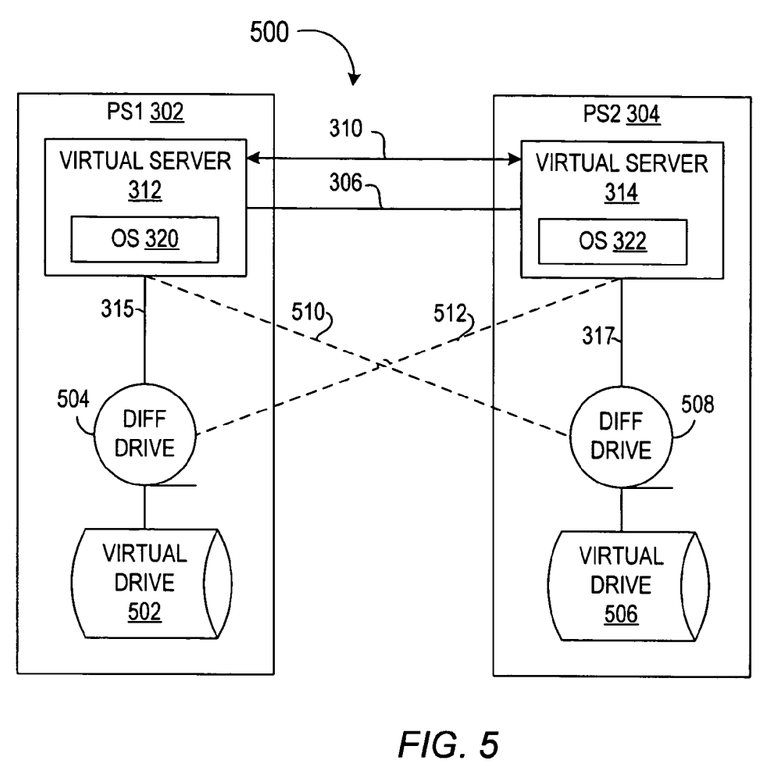
FIG. 5 is a block diagram of a cluster similar to the cluster of FIG. 3 except including a differential drive for each virtual drive.

FIG. 5 is a block diagram of a cluster 500 similar to the cluster 300 except including a differential drive for each virtual drive. Similar components include identical reference numbers, where physical servers 302, 304, the network 306, the interlink 310, and the virtual servers 312 and 314 with operating systems 320 and 322, respectively, are included. The virtual drives 316 and 318 are replaced with static virtual drives 502 and 506, respectively, which may represent "snapshots" of the virtual drives 316 and 318 at a specific time. Changes for the virtual drive 502 are stored in a differential drive 504 rather than being immediately incorporated within the virtual drive 502. Similarly, changes for the virtual drive 506 are stored in a differential drive 508 rather than being immediately incorporated within the virtual drive 506. Thus, the static virtual drive 502 and its differential drive 504 replace the virtual drive 316 and the static virtual drive 506 and its differential drive 508 replace the virtual drive 318. The network link 324 is replaced with a network link 510 between the virtual server 312 and the differential drive 508 and the network link 326 is replaced with a network link 512 between the virtual server 314 and the differential drive 504. Although only one differential drive is shown for each virtual server, it is understood that a chain of one or more differential drives may be employed.

Operation of the cluster 500 is substantially similar to the cluster 300, except that the differential drives 504, 508 enable optimized disk input/output (I/O) to increase speed, efficiency and performance. The operating systems 320, 322 configure and operate the drive pair 502, 504 in a mirrored configuration with the drive pair 506, 508 in a similar manner as previously described. Again, the link 512 is optional and the OS 322 need not have access to the virtual drive 502 to maintain the integrity of the data. Furthermore, the static state of the virtual drives 502 and 506 remain intact so that a roll-back may be performed to recapture the original static states of the virtual drives 502 and 506. The changes stored in the differential drives 504, 508 may be discarded or otherwise stored and re-used to recapture the additional changes to the static states of the virtual drives 502 and 506, if desired. In this manner, the use of differential drives for a cluster provides enhanced efficiency, performance and flexibility. The use of differential drives may be extended to other RAID configurations, such as, for example, RAID level 5 configurations.

Figure 6:
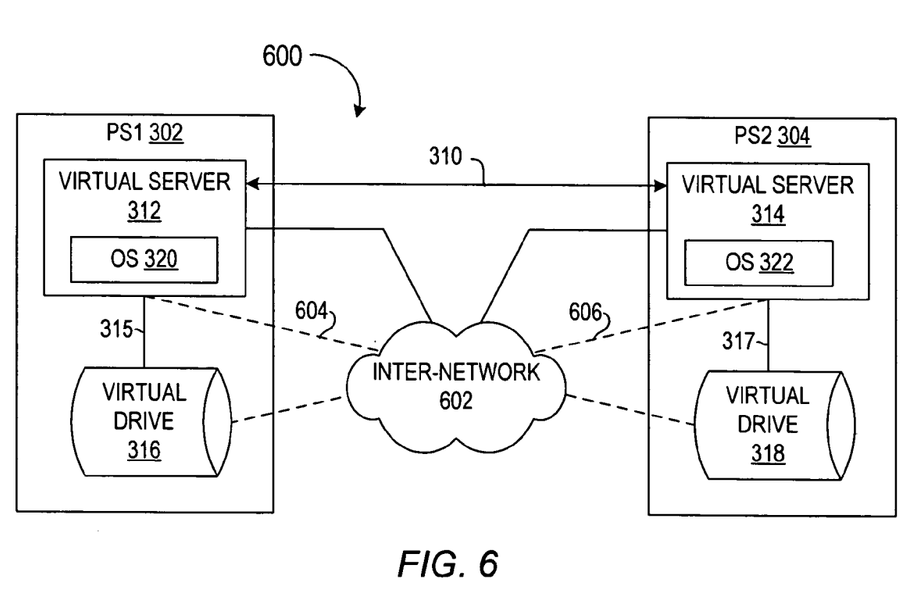
FIG. 6 is a block diagram of a cluster similar to the cluster of FIG. 3 except communicatively coupled via an inter-network.

FIG. 6 is a block diagram of a cluster 600 similar to the cluster 300 except communicatively coupled via an inter-network 602. Similar components include identical reference numbers, where physical servers 302, 304, the interlink 310, the virtual servers 312 and 314 with operating systems 320 and 322, respectively, are included. In this case, the network 306 is replaced with the inter-network 602 illustrating geographically split locations and remote communications. The illustration of the inter-network 602 is not intended to limit the embodiments of the network 306 to a local configuration, but instead to illustrate that the network 306 may be implemented as the inter-network 602 to physically separate the physical servers 302 and 304 as far apart from each other as desired. The inter-network 602 spans any size of geographic area, including multiple networks inter-connected together to span large geographic areas, such as wide-area networks (WANs) or the Internet or the like. Operation of the cluster 600 is substantially the same as the cluster 300.

Figure 7:
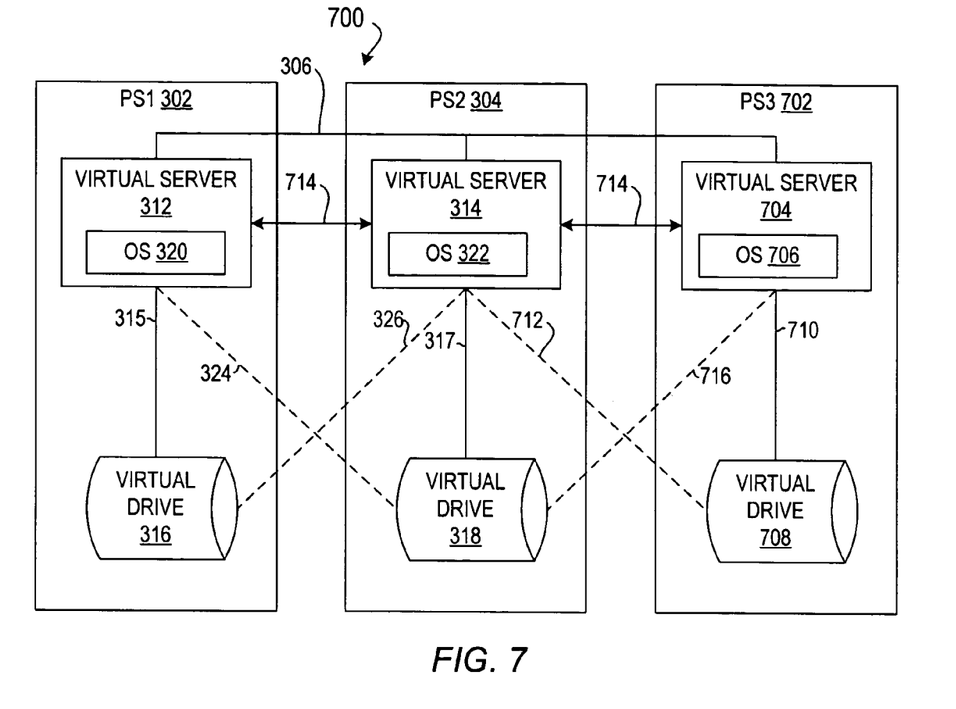
FIG. 7 is a block diagram of a cluster similar to the cluster of FIG. 3 except extended to include additional physical servers to form a cluster ring or cluster chain.

FIG. 7 is a block diagram of a cluster 700 similar to the cluster 300 except extended to include additional physical servers to form a cluster ring or cluster chain. Similar components include identical reference numbers, where physical servers 302 and 304, the network 306, and the virtual servers 312 and 314 with operating systems 320 and 322, respectively, are included. In this case, the network 306 is extended to include at least one additional physical server (PS3) 702, which includes another virtual server 704 and corresponding OS 706. The virtual server 704 is linked to a local virtual drive 708 via local link 710. The interlink 310 is replaced with interlink 714, which is provided between the virtual servers 312 and 314 in a similar manner as the interlink 310 and is further interfaced to the virtual server 704 and/or the physical server 702. Operation of the cluster 700 is similar to the cluster 300 in which the virtual server 312 is the active server and the virtual server 314 is a passive server in an A/P cluster configuration. Also, the virtual drives 316 and 318 are operated in a mirrored configuration in which the virtual drive 318 stores a copy of the cluster data set. In the event of failover, the virtual server 314 is promoted to active status to maintain operation of the cluster 700 without data loss.

In one embodiment, the virtual server 314 is an inactive instance of the virtual server 312, and is preconfigured so that the OS 322, upon activation of the virtual server 314, sees the virtual drive 318 as its primary drive. Also, in a similar manner as previously described, the virtual server 314 may be preconfigured so that the OS 322 sees the virtual drive 316 as the mirrored drive in the mirrored configuration, even if not immediately available because of failure of the physical drive 302. Alternatively, in the cluster 700, a network link 712 is provided between the virtual server 314 and the virtual drive 708, and the virtual server 314 is preconfigured so that the OS 322 instead sees the virtual drive 708 as the mirrored drive in the mirrored configuration. In this manner, the virtual drive 708 is a replacement drive for the virtual drive 316 to maintain a mirrored configuration. Upon activation of the virtual server 314, the OS 322 copies the cluster data set from the virtual drive 318 to the virtual drive 708 and then maintains the virtual drives 318 and 708 in a mirrored configuration. The interlink 714 may maintain the new failover cluster configuration using the virtual server 314 as the active server regardless of whether the virtual server 312 comes back online.

In yet another embodiment, the virtual server 704 may also be an inactive instance of the virtual server 312, so that when the virtual server 314 is made active in response to the failover event, the interlink 714 employs the virtual server 704 as the new passive virtual server. An optional network link 716 is provided so that the OS 706 may maintain the cluster data in a mirrored configuration in response to another failover event in which the virtual server 704 is promoted to active status to replace the previously active virtual server 314. The interlink 714 is configured to make the failover decisions based on any of the considerations previously described or described further below.

It is appreciated that the cluster chain configuration of the cluster 700 provides at least one replacement virtual drive to replace a failed drive in the data redundant configuration. Additional physical servers and corresponding virtual drives may be included in the network to operate as replacement virtual drives. Also, the cluster chain configuration applies equally to data redundant configurations including three or more virtual drives. The cluster is preconfigured to replace a failed drive in the cluster with a new drive, and the newly active OS is configured to use the replacement drive to re-establish the data redundant configuration, albeit with a different set of virtual drives.

Figure 8:
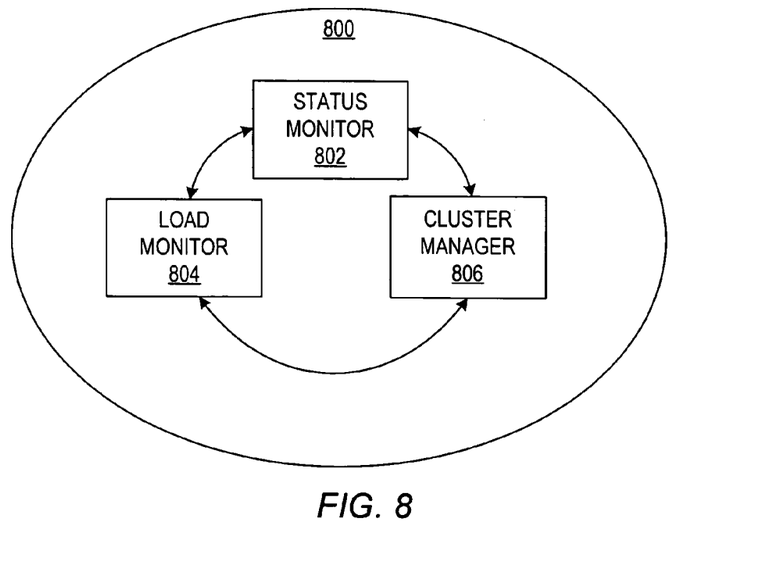
FIG. 8 is a simplified block diagram illustrating an exemplary embodiment of an interlink configured as a service and with expanded capabilities.

FIG. 8 is a simplified block diagram illustrating an exemplary embodiment of an interlink 800 configured as a service and with expanded capabilities, which may be employed as any of the interlinks 310, 410 and 714. The interlink 800 includes a status monitor 802, a load monitor 804 and a cluster manager 806 interfaced with each other. The status monitor 802 monitors the status of each of the active nodes (physical and virtual servers) of each cluster and provides failure notifications. The load monitor 804 monitors the relative load of the physical servers and provides load information. The cluster manager 806 configures and manages one or more clusters using a plurality of virtual servers implemented on a corresponding plurality of physical servers. The cluster manager 806 configures and maintains each cluster, manages operation of each established cluster, modifies cluster components if and when necessary or desired, and terminates clusters if and when desired.

For example, the cluster manager 806 receives a failure notification for a failed active node, selects a passive virtual server for promotion, and manages the failover process to maintain cluster operation without data loss. The cluster manager 806 uses load information from the load monitor 804 to determine which passive server to promote, and periodically or continuously monitors load information to optimize operation of each cluster. As previously described, the interlink (e.g., 310 or 410 or 714) may be very simple or relatively complex. It is advantageous if the interlink at least has the capability to manage the failover process, such as by selecting and promoting a passive server to active mode to resume handling of the cluster load, to simplify the configuration and operation of the virtual servers and virtual drives in the cluster. In particular, the virtual servers, operating systems, application programs, virtual drives and virtual software need not have any cluster capabilities at all or be aware of cluster operation or configuration.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A shared-nothing virtual cluster, comprising:
a plurality of virtual servers located on a corresponding plurality of physical servers linked together via a network;
said plurality of virtual servers collectively forming an active/passive (A/P) cluster including an active virtual server and at least one passive virtual server;
a plurality of virtual drives, each located on a corresponding one of said plurality of physical servers;
said active virtual server handling a cluster load and executing a first operating system (OS) that operates said plurality of virtual drives in a data redundant configuration that collectively stores a data set for said cluster;
each passive virtual server coupled to a sufficient number of said plurality of virtual drives with redundant information to recover said data set for said cluster; and
an interlinik operatively configured to detect failure of said active virtual server and to initiate promotion of one of said one or more passive virtual servers to active status to resume handling said cluster load after failover.

2. The shared-nothing virtual cluster of claim 1, wherein:
said plurality of virtual servers comprises said active virtual server located on a first physical server and a passive virtual server located on a second physical server;
wherein said plurality of virtual drives comprises a first virtual drive located on said first physical server and a second virtual drive located on said second physical server; and
wherein said first OS maintains said first and second virtual drives in a mirrored configuration in which said first virtual drive is a primary drive storing said data set and wherein said second virtual drive is a mirrored drive storing a copy of said data set.

3. The shared-nothing virtual cluster of claim 2, wherein said passive virtual server located on said second physical server is an inactive instance of said active virtual server and includes a second OS that is configured, when said passive virtual server located on said second physical server is activated, to operate said second virtual drive as its primary drive storing said data set.

4. The shared-nothing virtual cluster of claim 3, wherein said second OS is configured, when said passive virtual server located on said second physical server is activated, to maintain said mirrored configuration in which said first virtual drive is a mirrored drive storing a copy of said data set.

5. The shared-nothing virtual cluster of claim 3, wherein said second OS is configured, when said passive virtual server located on said second physical server is activated, to replace said first virtual drive in said mirrored configuration with a third virtual drive located on a third physical server as a mirrored drive storing a copy of said data set.

6. The shared-nothing virtual cluster of claim 1, wherein each of said plurality of virtual drives comprises a virtual static drive and at least one virtual differential drive.

7. The shared-nothing virtual cluster of claim 1, wherein said network comprises an inter-network and wherein at least one of said plurality of physical servers is physically located at a geographically remote location.

8. The shared-nothing virtual cluster of claim 1, wherein said plurality of virtual drives comprises at least three drives in said data redundant configuration.

9. The shared-nothing virtual cluster of claim 8, wherein said data redundant configuration comprises a RAID level 5 configuration.

10. The shared-nothing virtual cluster of claim 8, wherein at least one of said at least one passive virtual server comprises an inactive instance of said active virtual server including a corresponding OS that, when said inactive instance is activated, includes a network link to a majority of said plurality of virtual drives configured in said data redundant configuration.

11. The shared-nothing virtual cluster of claim 10, wherein said inactive instance is configured such that said corresponding OS uses a local one of said plurality of virtual drives as its primary drive.

12. The shared-nothing virtual cluster of claim 11, wherein said inactive instance is configured such that said corresponding OS uses a replacement virtual drive to replace a failed virtual drive in said data redundant configuration.

13. The shared-nothing virtual cluster of claim 1, wherein said interlink comprises:
a status monitor that detects failure of said active virtual server;
a load monitor that monitors relative load level of each of said plurality of physical servers; and
a cluster manager, interfaced with said status monitor and said load monitor, that configures and maintains said cluster, that manages failover, and that selects a passive virtual server for promotion during said failover.

14. The shared-nothing virtual cluster of claim 13, wherein said cluster manager monitors load information from said load manager to ensure adequate resources before and after said failover.

15. A virtual cluster, comprising:
a plurality of virtual drives located on a corresponding plurality of physical servers coupled together via a network;
a first virtual server located on a first of said plurality of physical servers, said first virtual server being active and handling a cluster load and storing cluster data in said plurality of virtual drives organized in a data redundant configuration;
a disk image incorporating attributes of said first virtual server stored on said plurality of virtual drives; and
an interlinik operative to monitor said first virtual server and to initiate promotion of a second virtual server on a second of said plurality of physical servers to active status using said disk image in the event of failure of said first virtual server to effectuate failover;
wherein said second virtual server, when activated, resumes handling of said cluster load and accesses said cluster data.

16. The virtual cluster of claim 15, wherein said plurality of virtual drives comprises a first virtual drive located on said first physical server and a second virtual drive located on said second physical server, wherein said data redundant configuration comprises a mirrored configuration in which said first virtual drive stores said cluster data and wherein said second virtual drive stores a mirrored copy of said cluster data.

17. The virtual cluster of claim 16, wherein said second virtual server is configured to use said second virtual drive as its primary drive when said second virtual server is activated.

18. The virtual cluster of claim 17, wherein said second virtual server is configured to use a third virtual drive to store said mirrored copy of said cluster data in said mirrored configuration when said second virtual server is activated.

19. The virtual cluster of claim 16, wherein said first virtual server synchronizes cluster data between said first and second virtual drives when said first virtual server and first virtual drive are available.

20. The virtual cluster of claim 16, wherein said second virtual server, when activated, synchronizes cluster data between said first and second virtual drives when said first virtual drive is available.

21. The virtual cluster of claim 15, wherein said plurality of virtual drives comprises at least three virtual drives located on a corresponding at least three of said plurality of physical servers, wherein said data redundant configuration including said at least three virtual drives collectively stores said cluster data, and wherein said second virtual server accesses said cluster data from less than all of said plurality of virtual drives when activated.

22. The virtual cluster of claim 21, wherein said data redundant configuration comprises a RAID level 5 configuration.

23. The virtual cluster of claim 21, wherein said second virtual server is configured to use a local one of said plurality of virtual drives as its primary drive when said second virtual server is activated.

24. The virtual cluster of claim 23, wherein said second virtual server is configured to use a replacement virtual drive to replace a failed virtual drive in said data redundant configuration when said second virtual server is activated.

25. The virtual cluster of claim 21, wherein said interlink activates said second virtual server on a selected one of said at least three of said plurality of physical servers.

26. The virtual cluster of claim 25, wherein said interlinik monitors relative load of said at least three of said plurality of physical servers and selects a physical server based on relative load.

27. The virtual cluster of claim 15, wherein said second virtual server is an inactive instance of said active virtual server prior to failover.

28. A method of configuring and operating a shared-nothing virtual cluster in a plurality of physical servers coupled together via a network including a plurality of virtual drives each located on a corresponding one of the plurality of physical servers, the method comprising:

operating an active virtual server on a first one of the plurality of physical servers to handle a cluster load;

storing, by the active virtual server, cluster data onto the plurality of virtual drives organized in a data redundant configuration;

detecting failure of the first physical server; and in the event of failure of the first physical server, activating a second virtual server on a second one of the plurality of physical servers to resume handling of the cluster load and providing access by the activated second virtual server to a sufficient number of the plurality of virtual drives that collectively stores the cluster data.

29. The method of claim 28, wherein said activating a second virtual server comprises activating an inactive instance of said active virtual server.

30. The method of claim 28, wherein said storing cluster data comprises storing cluster data on a first virtual drive and storing a mirrored copy of the cluster data on a second virtual drive, and wherein said providing access by the activated second virtual server comprises providing access to the second virtual drive.

31. The method of claim 28, wherein said storing cluster data comprises storing cluster data in redundant format across at least three virtual drives, and wherein said providing access by the activated second virtual server comprises providing access to less than all of said plurality of virtual servers.

32. The method of claim 28, further comprising coupling the plurality of physical servers together via an inter-network that enables the physical servers to be remotely located in a large geographical area.

33. The method of claim 28, further comprising storing a disk image including persistent attributes of the active virtual server, and wherein said activating a second virtual server comprises using the disk image.

34. The method of claim 28, further comprising:

locating each of a plurality of static virtual drives on a corresponding one of the plurality of physical servers;

locating each of a plurality of differential virtual drives with a corresponding one of the plurality of static virtual drives; and said storing cluster data comprising storing changes of the cluster data in the plurality of differential virtual drives.

35. The method of claim 28, further comprising monitoring relative load of each of the plurality of physical servers and providing load information.

36. The method of claim 35, further comprising selecting the first physical server to initially handle the cluster load based on the load information.

37. The method of claim 35, further comprising selecting the second physical server to resume handling of the cluster load based on the load information in the event of failure of the first physical server.

38. The method of claim 28, further comprising pre-configuring said second virtual server such that when it is activated, it executes an operating system that accesses the data redundant configuration including a local one of plurality of virtual drives as its primary drive.

39. The method of claim 38, further comprising pre-configuring said second virtual server such that when it is activated, it executes an operating system that accesses the data redundant configuration including a replacement one of plurality of virtual drives to replace a failed virtual drive.

* * * * *